United States Patent
Ekici et al.

(10) Patent No.: US 10,129,796 B2
(45) Date of Patent: Nov. 13, 2018

(54) DYNAMIC RAT SELECTION

(71) Applicant: Apple Inc., Cupertino, CA (US)

(72) Inventors: Ozgur Ekici, Ottawa (CA); Jianxiong Shi, Dublin, CA (US); Li Su, San Jose, CA (US); Sachin J. Sane, Santa Clara, CA (US); Sai Sravan Bharadwaj Karri, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/691,349

(22) Filed: Aug. 30, 2017

(65) Prior Publication Data

US 2018/0092007 A1    Mar. 29, 2018

Related U.S. Application Data

(60) Provisional application No. 62/399,034, filed on Sep. 23, 2016.

(51) Int. Cl.

| | |
|---|---|
| *H04W 88/08* | (2009.01) |
| *H04W 36/00* | (2009.01) |
| *H04W 52/40* | (2009.01) |
| *H04W 52/02* | (2009.01) |
| *H04W 52/24* | (2009.01) |
| *H04W 52/36* | (2009.01) |
| *H04B 17/318* | (2015.01) |
| *H04W 88/06* | (2009.01) |

(52) U.S. Cl.
CPC ...... *H04W 36/0066* (2013.01); *H04B 17/318* (2015.01); *H04W 36/0072* (2013.01); *H04W 36/0094* (2013.01); *H04W 52/0212* (2013.01); *H04W 52/245* (2013.01); *H04W 52/367* (2013.01); *H04W 52/40* (2013.01); *H04W 88/06* (2013.01)

(58) Field of Classification Search
CPC ..... H04W 12/02; H04W 28/26; H04W 68/04; H04W 24/02; H04W 36/08; H04W 48/18; H04W 48/20; H04W 88/06; H04W 36/14; H04W 36/0066; H04W 36/0072; H04W 36/0094; H04W 52/40; H04W 52/0212; H04W 52/245; H04W 52/367

See application file for complete search history.

(56) References Cited

U.S. PATENT DOCUMENTS

| | | | |
|---|---|---|---|
| 9,008,671 B2 | 4/2015 | Fodor et al. | |
| 9,363,742 B2 | 6/2016 | Wang et al. | |
| 2007/0037594 A1* | 2/2007 | Palenius | H04W 36/0088 455/502 |
| 2009/0034440 A1* | 2/2009 | Samar | H04L 63/20 370/310 |

(Continued)

*Primary Examiner* — Jean Gelin
(74) *Attorney, Agent, or Firm* — Meyertons Hood Kivlin Kowert & Goetzel, P.C.; Jeffrey C. Hood

(57) ABSTRACT

According to techniques described herein, a UE (which may be link budget limited) may be connected to a network using a first RAT. The UE may be configured to determine a first resource requirement for communication on the network using the first RAT and a second resource requirement for communication on the network using a second RAT. The UE may be further configured to trigger a re-selection to the second RAT in response to the UE determining that the second RAT is preferred over the first RAT based, at least in part, on a comparison of the first and second resource requirements.

20 Claims, 9 Drawing Sheets

(56) References Cited

U.S. PATENT DOCUMENTS

| | | | |
|---|---|---|---|
| 2012/0005051 A1* | 1/2012 | Deng | G06F 9/5072 |
| | | | 705/34 |
| 2013/0044657 A1* | 2/2013 | Oh | H04W 74/0875 |
| | | | 370/310 |
| 2014/0003254 A1 | 1/2014 | Andreoli-Fang et al. | |
| 2014/0133294 A1* | 5/2014 | Horn | H04W 28/0247 |
| | | | 370/230 |
| 2015/0079988 A1 | 3/2015 | Su et al. | |
| 2015/0271852 A1* | 9/2015 | Rahman | H04W 28/0247 |
| | | | 370/329 |
| 2016/0007370 A1* | 1/2016 | Kotreka | H04W 72/1215 |
| | | | 370/329 |
| 2016/0066245 A1* | 3/2016 | Vikberg | H04W 36/14 |
| | | | 370/331 |
| 2016/0072674 A1* | 3/2016 | Nolan | H04L 41/0813 |
| | | | 709/221 |
| 2016/0073305 A1* | 3/2016 | Yang | H04W 36/0083 |
| | | | 455/436 |
| 2016/0219440 A1* | 7/2016 | Wang | H04W 24/02 |
| 2016/0345217 A1 | 11/2016 | Tabet et al. | |
| 2017/0071021 A1* | 3/2017 | Jin | H04W 76/025 |
| 2018/0007594 A1* | 1/2018 | Ranta-Aho | H04W 36/0066 |

\* cited by examiner

DYNAMIC RAT SELECTION

PRIORITY CLAIM

This application claims priority to U.S. provisional patent application Ser. No. 62/399,034, entitled "Dynamic RAT Selection," filed Sep. 23, 2016, which is hereby incorporated by reference in its entirety as though fully and completely set forth herein.

FIELD OF THE INVENTION

The present application relates to wireless devices, and more particularly to an apparatus, system, and method for dynamic RAT selection by a link budget limited device.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), Long-term Evolution (LTE), LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

In wireless data communications, automatic repeat request (ARQ; also referred to as automatic repeat query), is used as an error-control method for data transmission that uses acknowledgements (messages sent by the receiver indicating that it has correctly received a data frame or packet) and timeouts (specified time periods allowed to elapse before an acknowledgment is received) to achieve reliable data transmissions. If the sender does not receive an acknowledgment before the timeout, it usually re-transmits the frame/packet until the acknowledgment is received, or the number of re-transmissions has exceeded a predefined limit.

Hybrid automatic repeat request (HARQ) is a combination of high-rate forward error-correcting coding and ARQ error-control. In standard ARQ, redundant bits are added to the data to be transmitted using an error-detecting code such as a cyclic redundancy check (CRC), with receivers detecting a corrupted message requesting a new message from the sender. In Hybrid ARQ, the original data is encoded with a FEC (forward error correction or forward error coding) code, and the parity bits are either immediately transmitted along with the message, or they are transmitted only upon request by a receiver that has detected an erroneous message. The FEC code is typically used to correct an expected subset of all errors that may occur, while the ARQ provides a fallback to correct errors that cannot be corrected through the use of only the redundancy included in the initial transmission. Therefore, hybrid ARQ offers better performance in poor signal conditions, but at the expense of significantly lower throughput during good signal conditions. A signal quality crossover point may be defined, below which simple HARQ may be preferred, and above which basic ARQ may be used.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from the MAC and higher layers. LTE also defines various physical layer channels for the uplink (UL).

The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information or Indicator (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Wireless communication can be useful for a wide breadth of device classes, ranging from relatively simple (e.g., potentially inexpensive) devices, which may have limited capabilities, to relatively complex (e.g., potentially more expensive) devices, which may have greater capabilities. Such devices may have different characteristics with respect to processing, memory, battery, antenna (power/range, directionality), and/or other capabilities. Devices that exhibit relatively limited reception and/or transmission capabilities (due to device design, device size, battery size, current transmission medium conditions, and/or other factors) may be referred to in some instances as "link budget limited" devices. It would be desirable to provide improved packet switched wireless communication services to various types of mobile devices, including link budget limited devices.

SUMMARY OF THE INVENTION

Embodiments are presented herein of methods for dynamic RAT selection for link budget limited devices, and of devices (e.g., wireless devices (UEs), base stations) configured to implement the methods. For example, some embodiments may relate to a user equipment (UE) that comprises at least one antenna, at least one radio, and a processing element, and which is configured to perform a subset or all of the operations described herein.

According to techniques described herein, the UE (which may be link budget limited) may be connected to a network using a first RAT. The UE may be configured to determine a first resource requirement for communication on the network using the first RAT and a second resource requirement for communication on the network using a second RAT. The UE may be further configured to trigger a re-selection to the second RAT in response to the UE determining that the second RAT is preferred over the first RAT based, at least in part, on a comparison of the first and second resource requirements.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
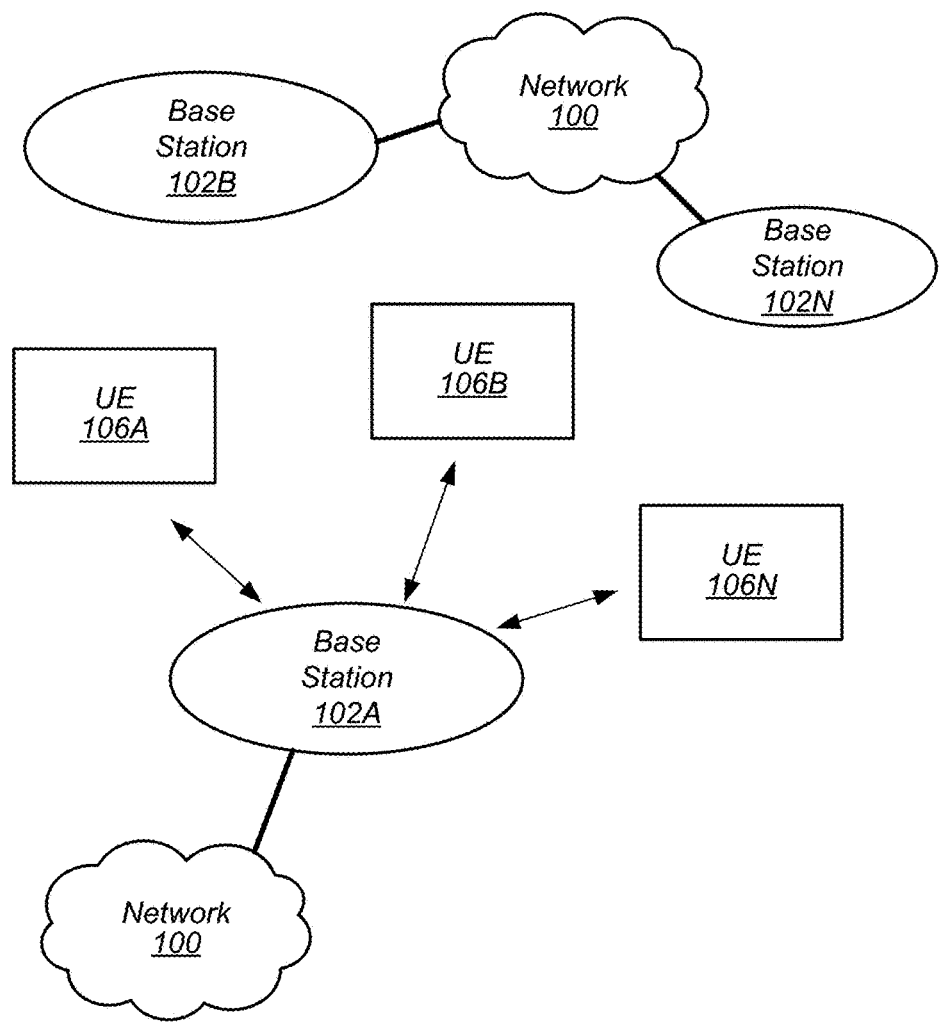
FIG. 1 illustrates an exemplary (and simplified) wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:
UE: User Equipment
BS: Base Station
ENB: eNodeB (Base Station)
GSM: Global System for Mobile Communication
UMTS: Universal Mobile Telecommunication System
LTE: Long Term Evolution
CS: Circuit-switched
PS: Packet-switched
CSFB: Circuit-switched fallback
MME: Mobile Management Entity
MSC: Mobile Switching Center
RNC: Radio Network Controller
RRC: Radio Resource Control
MT: Mobile Terminating
RLM: Radio Link Monitoring
RE: Resource Element[s]
BLER: Block Error Rate
PDCCH: Physical Downlink Control Channel
PDSCH: Physical Downlink Shared Channel
SNR: Signal-to-Noise Ratio
RLF: Radio Link Failure
CRS: Cell-Specific Reference Signals
RB: Resource Block
CQI: Channel Quality Indicator
SINR: Signal-To-Interference-Plus-Noise Ratio
DCI: Downlink Control Information
TTI: Transmit Time Interval
SIB: System Information Block Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable electronic devices such as smart watches and/or smart glasses (e.g. Apple Watch™, Google Glass™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any of various combinations of the above.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

DCI—refers to downlink control information. There are various DCI formats used in LTE in PDCCH (Physical Downlink Control Channel). The DCI format is a predefined format in which the downlink control information is packed/formed and transmitted in PDCCH.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

Figure 2:
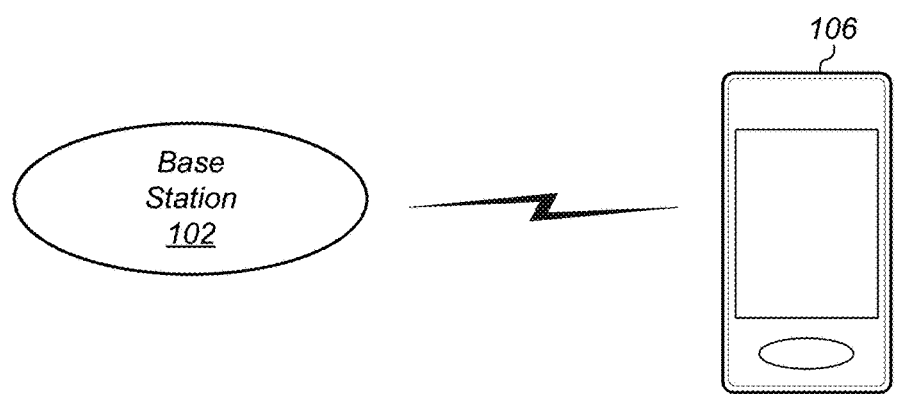
FIG. 2 illustrates an exemplary user equipment (UE) in communication with an exemplary base station, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices (UEs) and/or between the UEs and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also possibly come within communication range of, and be capable of receiving signals from, one or more other cells (which might be provided by base stations 102B-N and/or any other base stations), which may be referred to as "neighboring cells." Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
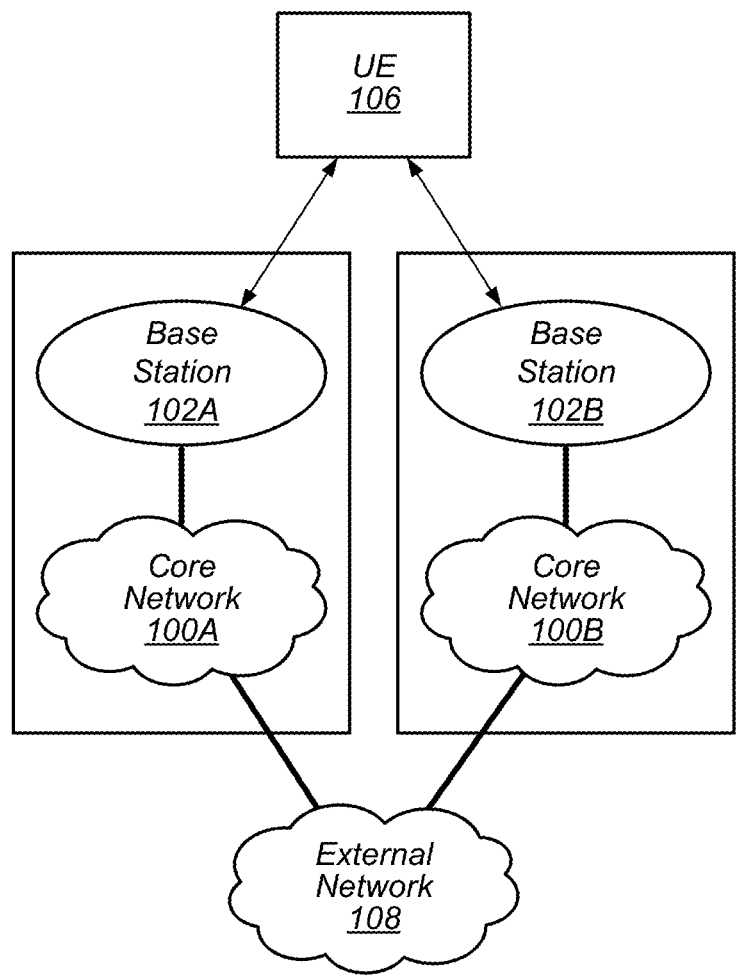
FIG. 3 illustrates an example simplified wireless communication system, wherein a UE communicates with an external network via two base stations, according to some embodiments.

FIG. 3—Communication System

FIG. 3 illustrates an example simplified wireless communication system, according to some embodiments. It is noted that the system of FIG. 3 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider or cellular carrier, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), TDS, LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, TDS, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 3, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and TDS, LTE and GSM and TDS, and/or any other combination of RATs) might be coupled to a network or service provider that also supports the different cellular communication technologies. In some embodiments, the UE 106 may be configured to use a first RAT that is a packet-switched technology (e.g., LTE) and a second RAT that is a circuit-switched technology (e.g., GSM or TDS).

As discussed above, UE 106 may be capable of communicating using multiple RATs, such as those within 3GPP, 3GPP2, or any desired cellular standards. The UE 106 might also be configured to communicate using WLAN (Wi-Fi), Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

As described further below, different cellular carriers may offer different public land mobile networks (PLMNs) and may provide different coverage area for telecommunication services. For example, a first cellular carrier may provide a first amount of packet-switched cellular coverage (e.g., LTE coverage), a second cellular carrier may provide a second amount of packet-switched cellular coverage (which may be at least partially overlapping), a third cellular carrier may provide a third amount of packet-switched cellular coverage (which may be at least partially overlapping with the first and second carriers), etc. In the United States the four main cellular carriers are Verizon, AT&T, Sprint, and T-Mobile, and various smaller carriers exist as well.

Figure 4:
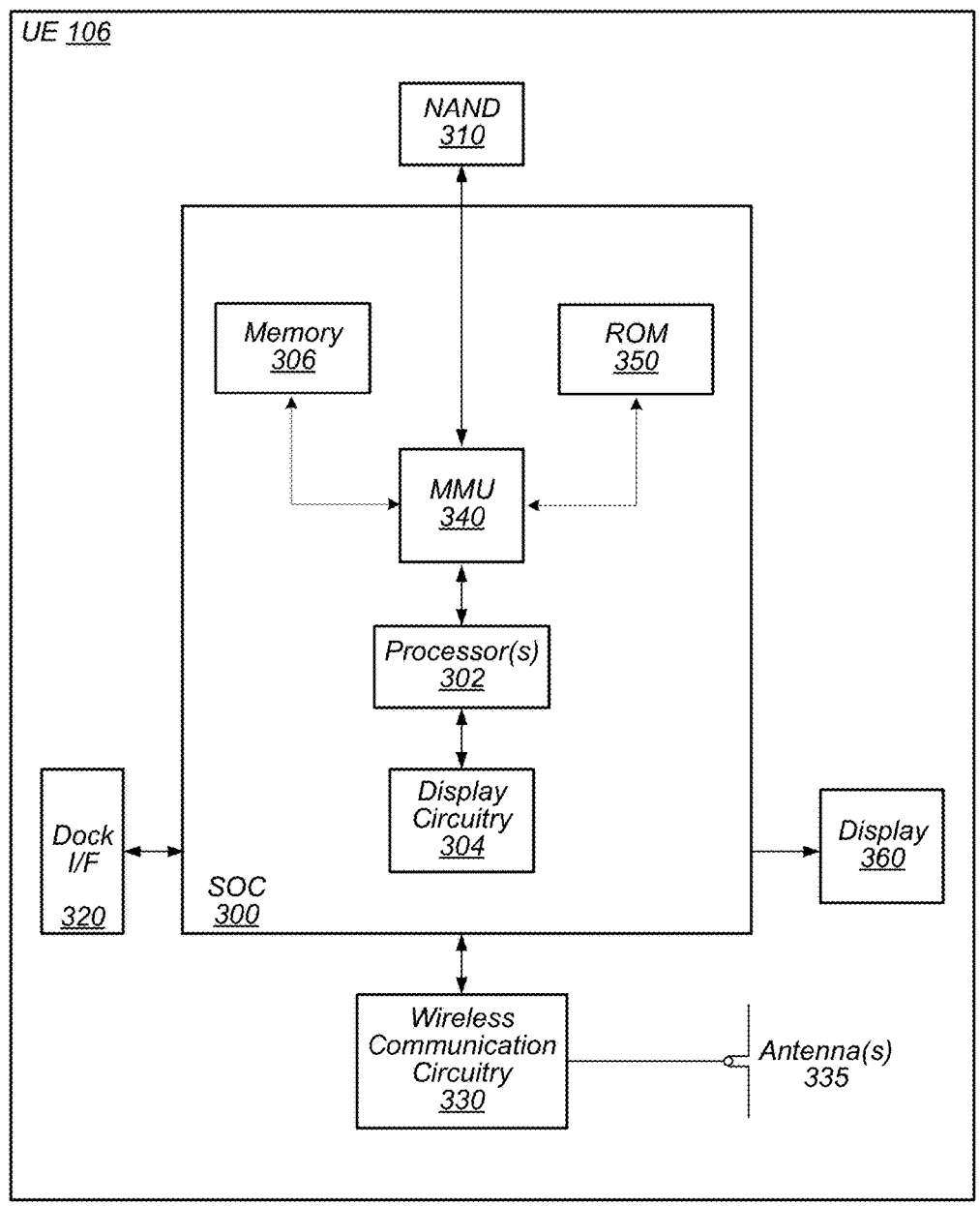
FIG. 4 illustrates an exemplary block diagram of a UE 106, according to some embodiments.

FIG. 4—Exemplary Block Diagram of a UE

FIG. 4 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features and methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition), the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIGS. 5 and/or 6.

Figure 5:
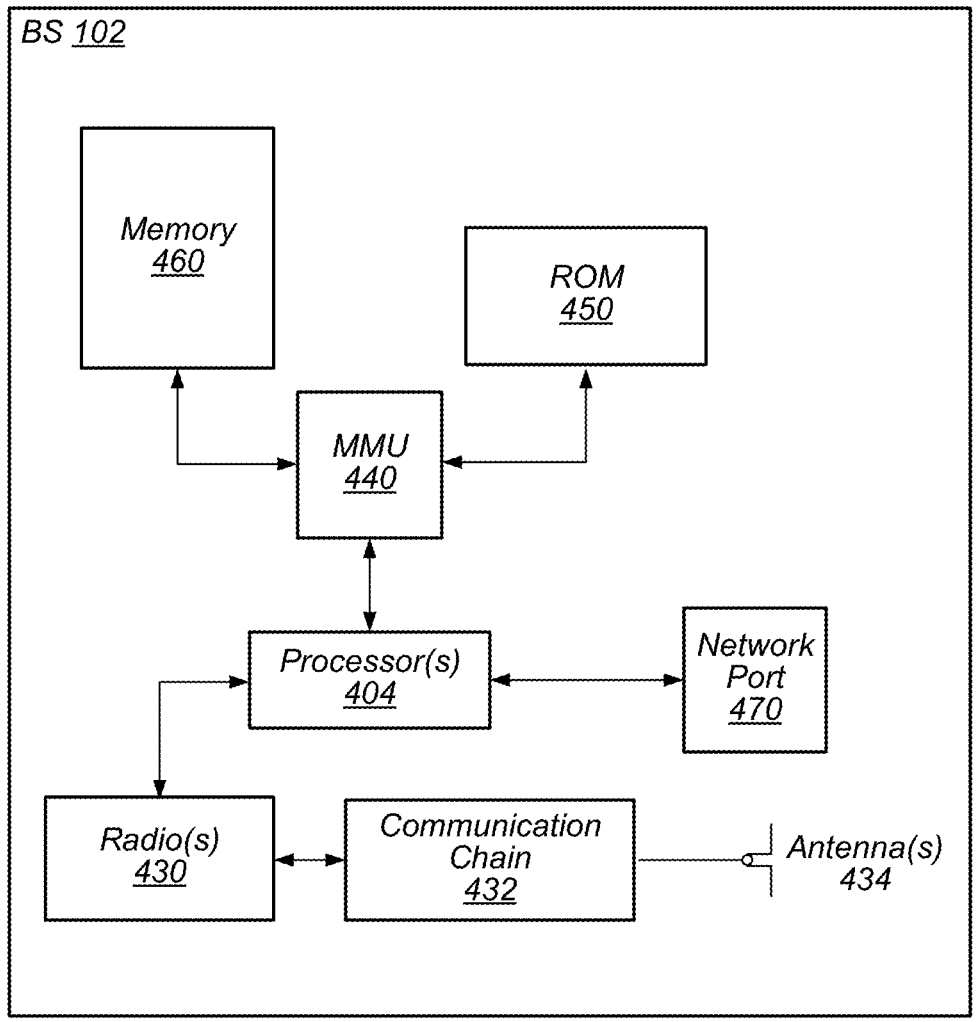
FIG. 5 illustrates an exemplary block diagram of a base station, according to some embodiments.

FIG. 5—Exemplary Block Diagram of a Base Station

FIG. 5 illustrates an exemplary block diagram of a base station 102, according to some embodiments. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The base station 102 may include hardware and software components for implementing or supporting implementation of features described herein, such as those described herein with reference to, inter alia, FIGS. 5 and 6. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the base station 102, in conjunction with one or more of the other components 430, 432, 434, 440, 450, 460, and/or 470, may be configured to implement or support implementation of part or all of the features described herein.

Cellular Coverage for Link Budget Limited Devices

There are many challenges associated with the hardware design of a wearable device, such as a smart watch, due to its size limitations. As a result, the capabilities of basic RF components such as the antenna may be limited compared to a traditional phone design, and the device may become link budget limited as a result. For example, the wearable device may be able to accommodate only one receive antenna (in contrast to a standard smart phone which typically has 2 receive antennas). In addition, the antenna in a wearable device may be less efficient in comparison to a smart phone design due to size constraints of the wearable device, and hence the reduced size of the antenna in the wearable device.

A decrease in the link budget impacts device performance on both uplink and downlink connections. For instance, on the uplink, design constraints may force the wearable device to transmit with high power. Such high power transmission not only causes increased battery drain, but may also trigger process interruptions/terminations for use case scenarios requiring high current (e.g. when screen, Wi-Fi, Bluetooth, and/or LTE components are operational simultaneously). For example, in a wearable device supporting cellular connectivity, such system process interruption frequency/duration may be a function of wireless device transmit power level and operating at a higher transmit power level may produce more frequent and longer system interruptions.

Cellular carriers have over the years generally optimized the cellular coverage in their markets relative to the Radio Frequency (RF) design of standard phones. The planned cellular coverage offered by most carriers is specifically tailored to the phone market, assuming typical maximum transmission power and/or receive sensitivity of standard smart phones. Thus a wearable device, which may have inferior link budget performance in comparison to a standard phone, may see significant cellular coverage issues relative to a standard phone.

In some existing implementations, wireless carriers may prefer that wireless devices in their network be camped/operate on LTE (4G LTE) radio access technology (RAT) rather than on a legacy RAT such as WCDMA (3G). There may be multiple reasons why wireless carriers push devices toward LTE. For example, from a marketing perspective, the operators may prefer to claim larger penetration of LTE coverage in their networks. Furthermore, subscribers may prefer to be serviced by the newest technology (e.g. LTE networks) rather than by a legacy network (e.g., WCDMA networks). Thus, although WCDMA coverage may be superior to LTE coverage in a particular area, wireless operators may push wireless devices to camp on the LTE network rather than the WCDMA network.

Figure 6A:
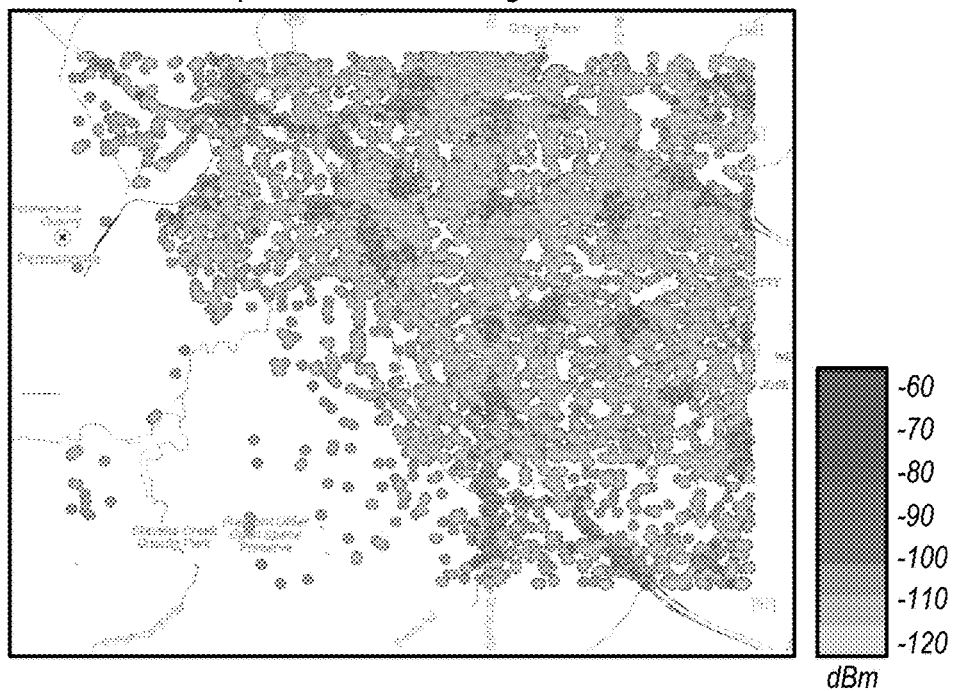
FIGS. 6A and 6B compare the signal strengths of different RATs for a wireless operator in a geographic region.
Figure 6B:
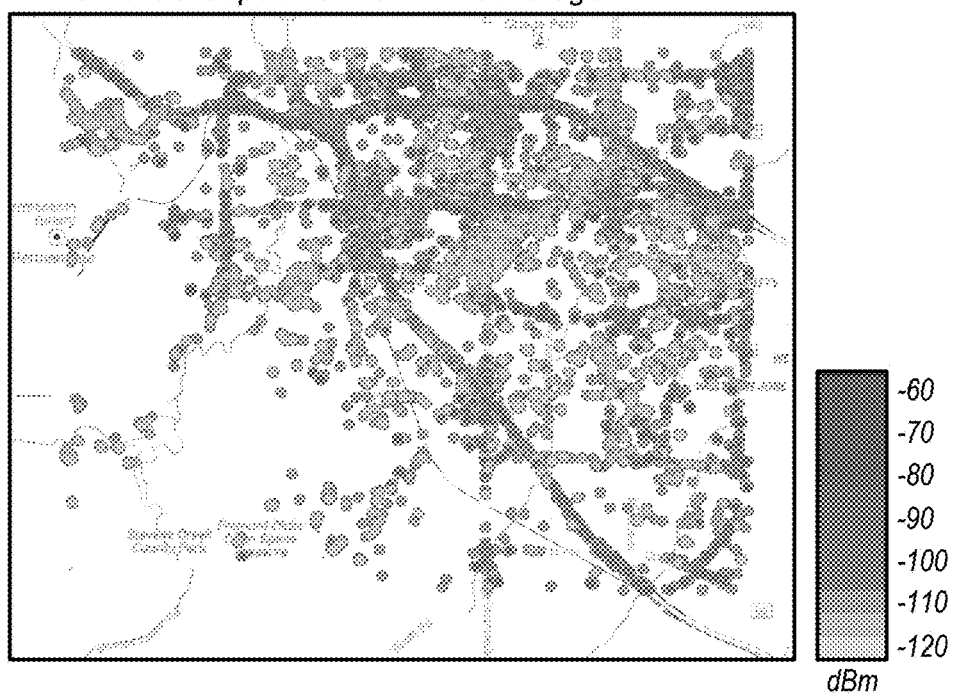

FIGS. 6A and 6B compare the signal strengths of different RATs for a wireless operator in a geographic region. In particular, FIGS. 6A and 6B compare LTE and WCDMA coverage, respectively, of the considered operator. In the figures better signal strength is represented by red. The data illustrated on the map is based on location data collected from currently deployed wireless devices in the geographic region during a particular time period. As illustrated, WCDMA coverage of the operator is significantly better than LTE coverage in the geographic region. Further, the number of WCDMA data points collected during the time period is much less than for LTE which is an indication that the operator pushed wireless devices to the LTE network despite WCDMA having better coverage and signal strength.

The tendency of wireless carriers to push devices to LTE networks (e.g., as illustrated by FIGS. 6A and 6B) with comparatively lower signal strength as compared to legacy networks (e.g., WCDMA) may in turn increase the percentage of wearable devices that operate at or close to maximum uplink transmit power level, potentially leading to more frequent and longer system interruptions. For example, in the greater San Francisco area, it is estimated that approximately sixty percent of potential wearable users will be operating close to their maximum transmit power level in LTE for a particular operator. As another example, it is estimated that approximately forty percent of wearable users will be operating close to their maximum transmit power level in LTE for another operator.

Embodiments described herein provide techniques for improved cellular communication performance. In some embodiments, a device (e.g., UE 106) may be configured to overwrite network settings and choose a RAT to operate on if the device detects the RAT would provide lower uplink transmit power level. In some embodiments, the choice of a RAT to operate on may aid the device to avoid system interruptions due to high current requirements and may also provide better battery performance. In some embodiments, devices (e.g., UE 106) may be link budget limited devices, such as wearable devices.

Figure 7:
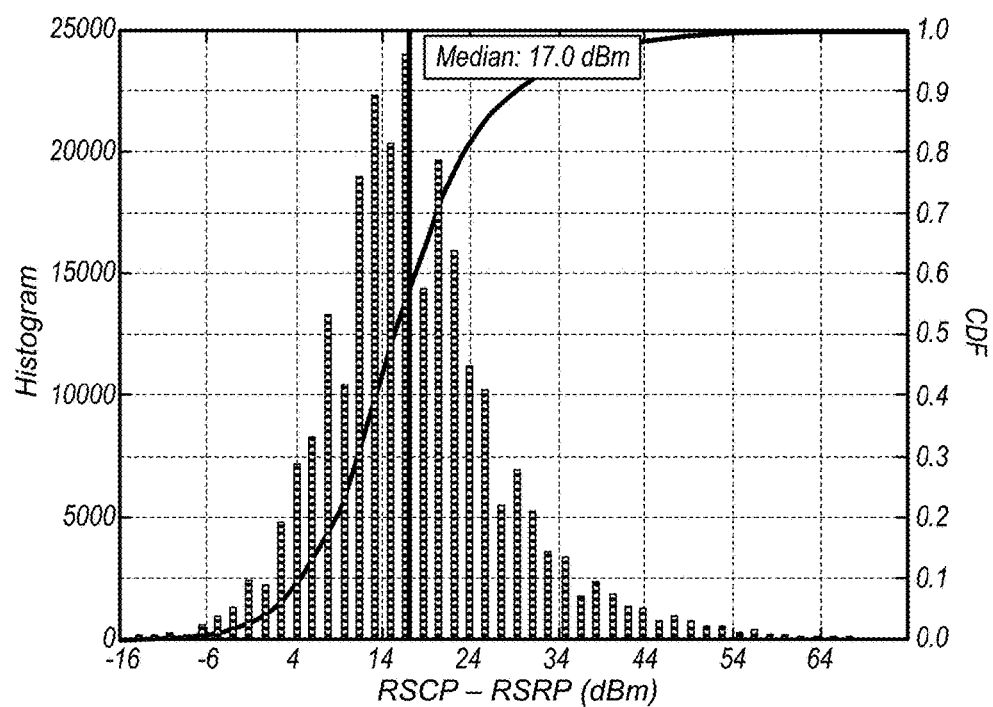
FIG. 7 illustrates an example of a difference in signal strength between WCDMA received signal code power (RSCP) and LTE reference signal received power (RSRP) at a location when a device transmit power level approaches the maximum in LTE according to some embodiments.

FIG. 7—Difference in Signal Strength Between WCDMA RSCP and LTE RSRP

FIG. 7 illustrates a difference in signal strength between WCDMA received signal code power (RSCP) and LTE reference signal received power (RSRP) at a location when a device transmit power level approaches the maximum in LTE (e.g., LTE RSRP<−117 dBm) for an existing implementation. In particular, FIG. 7 demonstrates that switching RATs, e.g., using embodiments described herein, from LTE to WCDMA in marginal LTE coverage areas may benefit a wireless device by a median of approximately 17 dBm. This gain may translate into a transmit power decrease of approximately 4 dBm, which may minimize a time the wireless device needs to transmit at its maximum power level. Additionally, the switching of RATs may reduce the possibility of system interruptions caused by high current requirements. For example, experiments implementing embodiments described herein estimate that for a typical voice call scenario, a wireless device may save approximately fifteen percent power by facilitating the switch between RATs (e.g., the wireless device may save approximately 150 mW by switching from LTE to WCDMA) in the scenario of FIG. 7.

Figure 8:
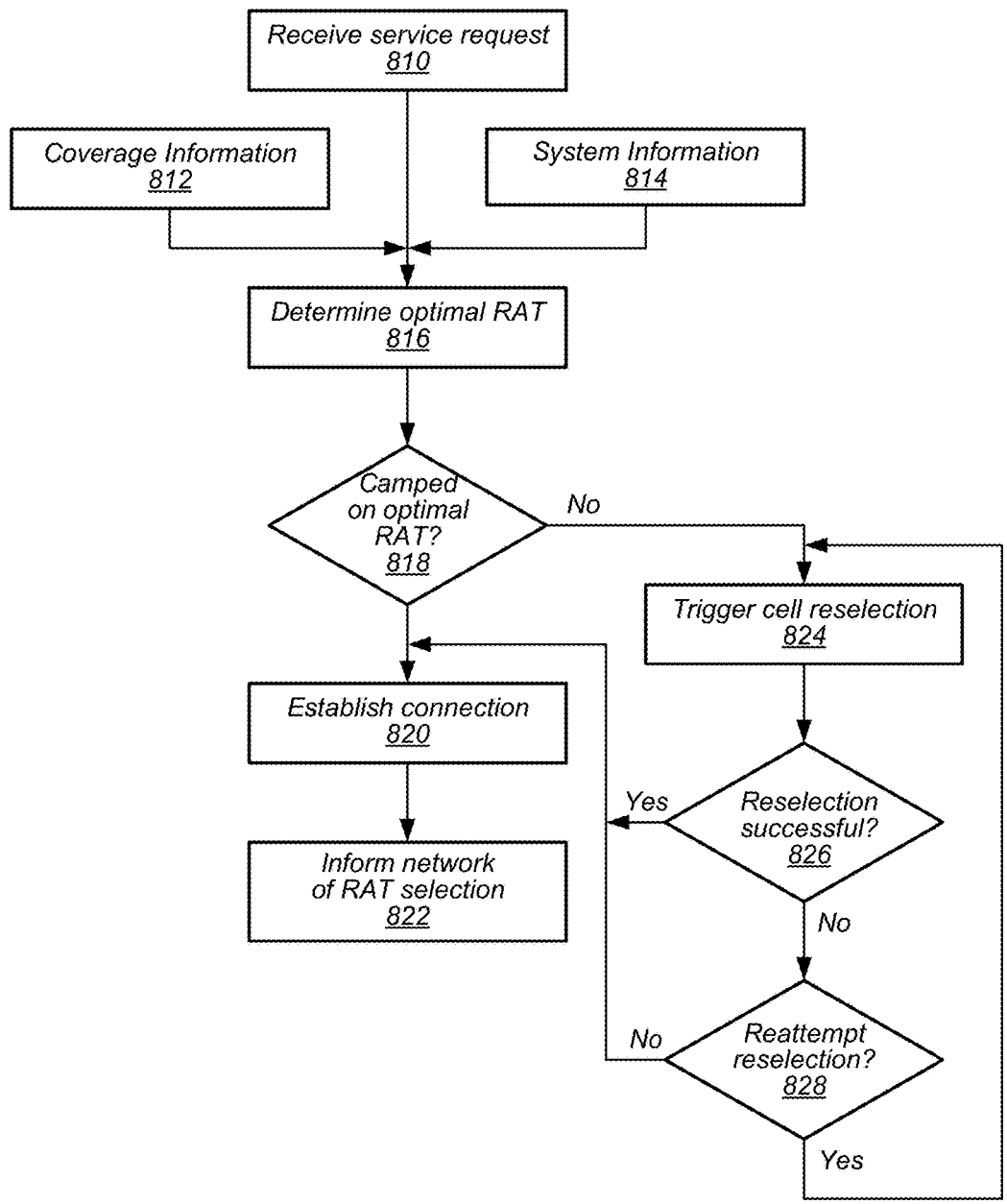
FIG. 8 illustrates a block diagram of an example of a method for a wireless device (e.g., UE 106) to dynamically determine an optimal RAT and potentially trigger cell reselection to the optimal RAT, according to some embodiments.

FIG. 8—Flowchart: Determination of Optimal RAT and Cell Reselection

FIG. 8 illustrates a block diagram of an example of a method for a wireless device (e.g., UE 106) to dynamically determine an optimal RAT and potentially trigger cell reselection to the optimal RAT, according to some embodiments. The method shown in FIG. 8 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 810, a service request for an upcoming communication from a network may be received. The service request may be a call request for an incoming or outgoing transmission, such as Voice over LTE (VoLTE), Facetime audio, Facetime video, and so forth. Note that in the case of an incoming call, the call request could be for a VoLTE call, however, according to some embodiments, the UE may respond to the call request as non-VoLTE (e.g., via a 3G RAT such as WCDMA).

At 812, coverage information may be acquired, e.g., from a companion device (e.g., such as another UE 106) and/or from local measurements. For example, the coverage information may include WCDMA RSCP, LTE RSRP, and/or any among various other measurements of signal strength, as well as network operator preferences. In some embodiments, the coverage information may be collected by the companion device and/or may be crowd sourced and distributed from a server as further described below in reference to FIG. 10.

At 814, system information may be acquired. The system information may include one or more of a power consumption estimate, a thermal response estimate, a remaining battery life of the UE, a maximum transmit power level of the UE, and/or RAT-specific antenna frequency attenuation, among other possibilities. In some embodiments, the system information may also include one or more of a current temperature of the UE and/or a current ambient temperature (e.g., as determined by the UE and/or a companion UE).

At 816, an optimal RAT may be determined, e.g., based on one or more of the service request, the coverage information, and/or the system information. One or more of the service request, the coverage information, and the system information may be considered singly or in combination to determine the optimal RAT, according to various embodiments. For example, each of the service request, the coverage information, the system information, and subsets of the coverage information and the system information, may be considered in combination through a weighted or unweighted average to determine the optimal RAT, as desired.

For example, a wireless device (UE) may determine an optimal RAT based (at least in part) on the service request received at 810. In some embodiments, the UE may determine an application type associated with the service request, such as Facetime audio, Facetime video, or voice-over LTE (VOLTE). Note that different application types may require different resource allocations and the UE may classify the service request according to anticipated resource requirements for communications associated with the service request.

As another example, a UE may determine an optimal RAT based (at least in part) on coverage information, such as WCDMA RSCP, LTE RSRP, and/or network operator preferences. For example, stronger coverage for a second RAT (e.g., as compared to a first RAT) may allow for communication using the second RAT to proceed with a lower transmit power as compared to the first RAT with weaker coverage. In such instances, the UE may determine the second RAT to be the optimal RAT as a result of the coverage information. In some embodiments, the coverage information may be determined by a measurement performed via an antenna of the UE. In some embodiments, a companion device to the UE may determine the coverage information by its own radio (e.g., via network measurements) and may communicate this information to the UE by one among many possible short-range (e.g., Wi-Fi, BlueTooth, etc.) or cellular (e.g., WDCMA, LTE, etc.) wireless technologies. In some embodiments, the coverage information may be crowd-sourced from a plurality of UEs on the network, wherein the crowd-sourced information is compiled by a server on the network and communicated to the UE by any of the preceding methods.

In some embodiments, the coverage information may include network operator preferences. For example, network operator preference for a first RAT over a second RAT may be incorporated as a predetermined RAT preference threshold, e.g., in order to trigger reselection to the second RAT as the optimal RAT, a combination of factors (e.g., based on the requested service, coverage information, and system information as further discussed below) may be required to indicate preference for the second RAT to a degree that exceeds the RAT preference threshold. In some embodiments, the factors may be considered either separately and/or in combination.

As yet another example, the UE may further determine an optimal RAT based (at least in part) on system information, such as a power consumption estimate, a thermal response estimate, a remaining battery life of the UE, a maximum transmit power level of the UE, and/or RAT-specific antenna frequency attenuation, among other possibilities.

In some embodiments, the system information may include estimated power consumption by the UE for the requested service. For example, the estimated power consumption may be calculated based (at least in part) on an application type associated with the service request. As another example, the estimated power consumption may be calculated further based (at least in part) on coverage information associated with each RAT. For example, the UE may determine an estimated energy required per byte of data communicated for each RAT based on either or both of an application type and coverage information. Further, the UE may determine the optimal RAT based (at least in part) on a comparison of the estimated power consumption with a battery level of the UE. Further, the UE may determine the optimal RAT based (at least in part) on an antenna frequency attenuation offset between different RATs.

In some embodiments, the system information may additionally or alternatively include a thermal response estimation. In some embodiments, the thermal response estimation may include an estimation of a final temperature of the UE subsequent to completion of the requested service on each of a plurality of RATs available to the UE. For example, the UE may estimate a first final temperature subsequent to completion of the requested service via a first RAT and compare the first final temperature to an estimate of a second final temperature subsequent to completion of the requested service via a second RAT. In some embodiments, the thermal response estimation may include an estimation of a maximum temperature of the UE during the requested service on each of a plurality of RATs available to the UE. For example, the UE may estimate a first maximum temperature during the requested service via a first RAT and compare the first maximum temperature to an estimate of a second maximum temperature during the requested service via a second RAT. In some embodiments, the thermal response estimation may include estimation of a temperature gradient (or temperature rise) during the requested service. For example, the UE may estimate a first temperature gradient during the requested service via a first RAT and compare the first temperature gradient to an estimate of a second temperature gradient during the requested service via a second RAT.

In some embodiments, the thermal response estimation may be calculated based (at least in part) on a combination of the coverage information, the application type associated with the service request, the ambient temperature, and/or the present temperature of the UE. The ambient temperature may be measured directly by the UE and/or may be communicated to the UE by a companion device, according to various embodiments. The present temperature of the UE may be measured directly by the UE, or by other means, according to various embodiments. For example, a first estimated temperature associated with completing (and/or associated with performing) the requested service with a first RAT may be above a temperature threshold and temperatures higher than the temperature threshold may be associated with a higher probability of system shutdown. In addition, if a second estimated temperature associated with completing (and/or associated with performing) the upcoming communication with a second RAT is below the temperature threshold, the UE may be configured to consider the second RAT as the optimal RAT. In some embodiments, the UE may be configured to directly compare the first and second estimated temperatures and consider the RAT associated with the lower estimated temperature to be the optimal RAT. Note that in some embodiments, the temperature threshold may be associated, at least in part, with a temperature metric such as a maximum temperature (upon completion and/or during the service request), a maximum temperature rise relative to an ambient temperature or an initial temperature of the UE (e.g., at initiation of the service request), a temperature gradient, and/or various other temperature metrics.

At 818, a current RAT (e.g., presently camped on RAT) may be compared to the optimal RAT determined at 816 to determine whether the current RAT is the optimal RAT.

At 820, if the current RAT is determined to be the optimal RAT at 818, a connection with the current (optimal) RAT may be established.

At 822, the network may be informed that the current RAT has been selected.

At 824, cell reselection may be triggered if the current RAT is determined not to be the optimal RAT.

At 826, success of the cell reselection may be determined. If reselection was successful, the method may return to 820 and a connection with the optimal RAT may be established. If reselection was not successful, the method may continue to 828.

At 828, whether to reattempt cell reselection may be determined and the method may return to 824 if reselection will be reattempted and to 820 if reselection will not be attempted (in which case the current RAT is considered the optimal RAT). In some embodiments, the determination whether to reattempt reselection may be decided based (at least in part) on a variety of factors. For example, if the failure is due to a network failure, reselection may not be reattempted. As another example, if a first random access channel (RACH) attempt failed, reselection may be reattempted, e.g., up to a predetermined (or specified) threshold number of times and/or for a predetermined (or specified) duration of time.

Figure 9:
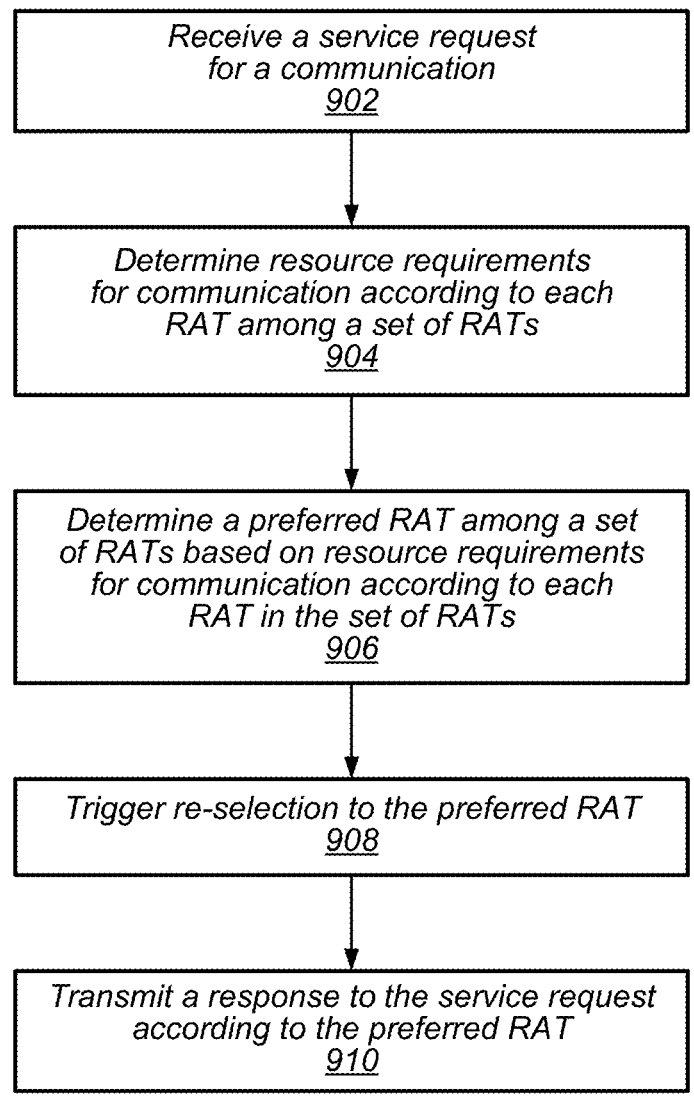
FIG. 9 illustrates a block diagram of an example of a method for a wireless device (e.g., UE 106) to trigger reselection to a preferred RAT, according to some embodiments.

FIG. 9—Flowchart: Service Request and Reselection to Preferred RAT

FIG. 9 illustrates a block diagram of an example of a method for a wireless device (e.g., UE 106) to trigger reselection to a preferred RAT, according to some embodiments. The method shown in FIG. 9 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 902, a service request for a communication from a network may be received.

At 904, the resource requirements for communication according to each RAT among a set of RATs may be determined. The resource requirements may be determined based on a variety of factors including the service request, coverage information and/or system information, wherein these factors may be considered singly or in combination.

For example, the resource requirements may be based (at least in part) on the service request received at 902. In some embodiments, the UE may determine an application type associated with the service request, such as Facetime audio, Facetime video, or voice-over LTE (VoLTE). Note that different application types may be associated with different resource requirements and the UE may classify the service request according to anticipated resource requirements for communications associated with the service request.

As another example, the resource requirements may be based (at least in part) on coverage information, such as WCDMA RSCP, LTE RSRP, and/or network operator preferences. For example, stronger coverage for a second RAT (e.g., as compared to a first RAT) may allow for communication using the second RAT to proceed with a lower transmit power as compared to the first RAT with weaker coverage. In some embodiments, the coverage information may be determined by a measurement performed via an antenna of the UE. In some embodiments, a companion device to the UE may determine the coverage information by its own radio (e.g., via network measurements) and may communicate this information to the UE by one among many possible short-range (e.g., Wi-Fi, BlueTooth, etc.) or cellular (e.g., WDCMA, LTE, etc.) wireless technologies. In some embodiments, the coverage information may be crowd-sourced from a plurality of UEs on the network, wherein the crowd-sourced information is compiled by a server on the network and communicated to the UE by any of the preceding methods.

In some embodiments, the resource requirements may be based (at least in part) on network operator preferences. For example, network operator preference for a first RAT over a second RAT may be incorporated as a predetermined RAT preference threshold, e.g., in order to trigger reselection to the second RAT as the preferred RAT, a combination of factors (e.g., based on the requested service, coverage information, and system information as further discussed below) may be required to indicate preference for the second RAT to a degree that exceeds the RAT preference threshold. In some embodiments, the factors may be considered either separately and/or in combination.

As yet another example, the resource requirements may be based (at least in part) on system information, such as a power consumption estimate, a thermal response estimate, a remaining battery life of the UE, a maximum transmit power level of the UE, and/or RAT-specific antenna frequency attenuation, among other possibilities.

In some embodiments, the system information may include estimated power consumption by the UE for the requested service. For example, the estimated power consumption may be calculated based (at least in part) on an application type associated with the service request. As another example, the estimated power consumption may be calculated further based (at least in part) on coverage information associated with each RAT. For example, the UE may determine an estimated energy required per byte of data communicated for each RAT based on either or both of the application type and the coverage information. Further, the system information may include a comparison of the estimated power consumption with a battery level of the UE. Further, the UE may base the resource requirements (at least in part) on an antenna frequency attenuation offset between different RATs.

In some embodiments, the system information may additionally or alternatively include a thermal response estimation. In some embodiments, the thermal response estimation may include an estimation of a final temperature of the UE subsequent to completion of the requested service on each of a plurality of RATs available to the UE. For example, the UE may estimate a first final temperature subsequent to completion of the requested service via a first RAT and compare the first final temperature to an estimate of a second final temperature subsequent to completion of the requested service via a second RAT. In some embodiments, the thermal response estimation may include an estimation of a maximum temperature of the UE during the requested service on each of a plurality of RATs available to the UE. For example, the UE may estimate a first maximum temperature during the requested service via a first RAT and compare the first maximum temperature to an estimate of a second maximum temperature during the requested service via a second RAT. In some embodiments, the thermal response estimation may include estimation of a temperature gradient (or temperature rise) during the requested service. For example, the UE may estimate a first temperature gradient during the requested service via a first RAT and compare the first temperature gradient to an estimate of a second temperature gradient during the requested service via a second RAT.

In some embodiments, the thermal response estimation may be calculated based (at least in part) on a combination of the coverage information, the application type associated with the service request, the ambient temperature, and/or the present temperature of the UE. The ambient temperature may be measured directly by the UE and/or may be communicated to the UE by a companion device, according to various embodiments. For example, a first estimated temperature associated with completing (and/or associated with performing) the requested service via a first RAT may be above a temperature threshold and temperatures higher than the temperature threshold may be associated with a higher probability of system shutdown. In addition, if a second estimated temperature associated with completing (and/or associated with performing) the upcoming communication with a second RAT is below the temperature threshold, the UE may be configured to consider the second RAT as being associated with a preferable resource requirement. In some embodiments, the UE may be configured to directly compare the first and second estimated temperatures and consider the RAT associated with the lower estimated temperature to be associated with a preferable resource requirement. Note that in some embodiments, the temperature threshold may be associated, at least in part, with a temperature metric such as a maximum temperature (upon completion and/or during the service request), a maximum temperature rise relative to an ambient temperature or an initial temperature of the UE (e.g., at initiation of the service request), a temperature gradient, and/or various other temperature metrics.

At 906, a preferred RAT among a set of RATs may be determined based (at least in part) on the resource requirements for communication according to each RAT in the set of RATs.

At 908, reselection to the preferred RAT may be triggered.

At 910, a response to the service request may be transmitted according to the preferred RAT.

Figure 10:
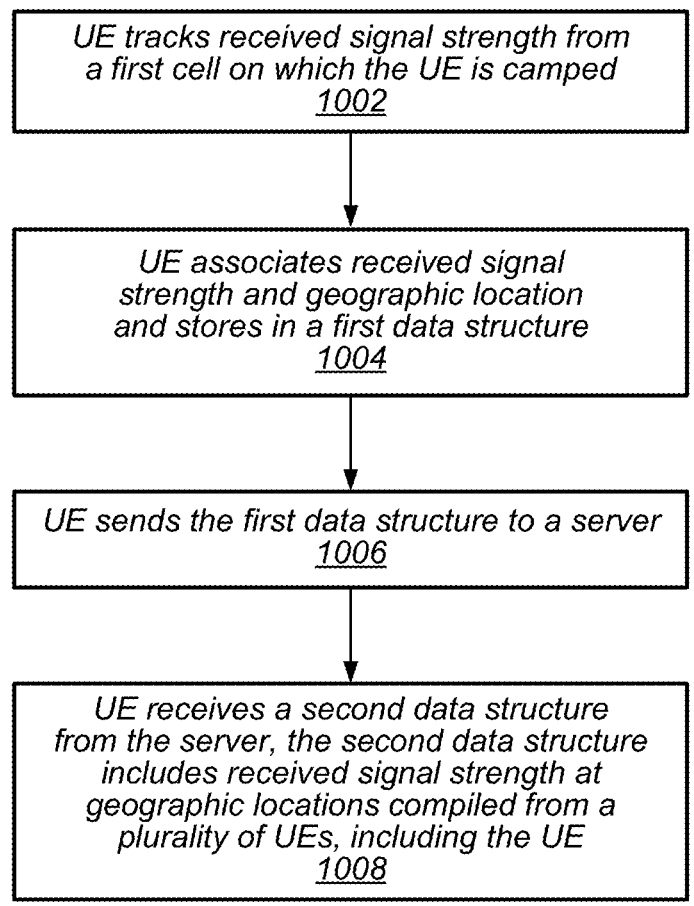
FIG. 10 is a flowchart diagram illustrating an example of a method for a UE to dynamically select a new cell for communication in a cellular network based on crowd-sourced information, according to some embodiments.

FIG. 10—Flowchart: Crowd-Sourced Cell Selection

FIG. 10 is a flowchart diagram illustrating an example of a method for a UE to dynamically select a new cell for communication in a cellular network based on crowd-sourced information, according to some embodiments. The new cell may be associated with a different RAT than the current cell on which the UE is camped. The UE may be a link budget limited UE (e.g., a wearable device).

The method shown in FIG. 11 may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

At 1002, the UE may track received signal strength from a first cell currently connected to the UE. In other words, the UE may monitor and/or log received signal strength from the first cell (or a base station in the first cell) on which the UE is currently camped. The first cell may operate on a first RAT.

At 1004, the UE may associate the received signal strength with a geographic location of the UE. Thus, the UE may link the received signal strength from the first cell to a geographic location. The UE may store the received signal strength and geographic location in a first data structure. The first data structure may be stored on the UE. Alternatively, or in addition, the first data structure may be stored on a companion UE that is connected to the UE via a local connection (such as Wi-Fi or Bluetooth).

At 1006, the UE may send the first data structure to a server. The first data structure may be sent periodically (e.g., at predetermined intervals), when requested by the server, and/or based on occurrence of various conditions, such as establishment of a local connection to a wireless access point or a companion UE, the first data structure reaching a size threshold, and so forth. The UE may send the first data structure via a cellular connection, a Wi-Fi connection, or may send the first data structure via the companion UE. In other words, the UE may store the first data structure and may send it to the companion UE via a local connection and the companion UE may forward the first data structure to the server via a cellular or Wi-Fi connection.

At 1008, the UE may receive a second data structure from the server. The second data structure may be received periodically (e.g., at predetermined intervals), when requested by the UE, and/or based on occurrence of various conditions, such as establishment of a local connection to a wireless access point or a companion UE, the first data structure reaching a size threshold, and so forth. The second data structure may be received over a cellular or Wi-Fi connection. In some embodiments, the companion UE may receive the second data structure and send it to the UE via a local connection. The second data structure may include information based on received signal strength at geographic locations compiled from a plurality of UEs, including the UE. In other words, the second data structure may include crowd-sourced data compiled from a plurality of UEs sending first data structures to the server.

In some embodiments, the information may include a prioritized list of public land mobile networks (PLMNs) (e.g., a prioritized look up table (LUT)). In some embodiments, the PLMNs may be prioritized based on signal strength at a geographic location. The prioritized list of PLMNs may include PLMNs from carriers for which the UE has an associated subscription.

In some embodiments, the information may include a plurality of prioritized lists of PLMNs and each prioritized list may include PLMNs associated with one of a particular geographic location, a particular geographic zone, or a particular geographic region. In other words, each PLMN list (or prioritized LUT), may be associated with a particular region. The region may be a location (e.g., a particular location with a specified distance of the UE), a zone (e.g. a city, a county, or a state), or a region (e.g., a plurality of cities, a metropolitan area, one or more states, and so forth). In some embodiments, the UE may use a first prioritized list of the plurality of prioritized lists based on geographic location of the UE.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method, comprising:

by a user equipment device (UE) comprising at least one antenna, at least one radio coupled to the at least one antenna for performing wireless cellular communications with a cellular network, and at least one processing element coupled to the at least one radio, wherein the UE is connected to a network using a first radio access technology (RAT), the method comprising:

determining a first resource requirement for communication on the network using the first RAT and a second resource requirement for communication on the network using a second RAT;
triggering a re-selection to the second RAT in response to the UE determining that the second RAT is preferred over the first RAT based, at least in part, on a comparison of the first and second resource requirements; and
based on a determination that the attempt to reselect to the second RAT has failed:
incrementing a reattempt counter;
determining whether the reattempt counter exceeds a predetermined threshold;
reattempting reselection to the second RAT based on determining that the reattempt counter does not exceed the predetermined threshold; and
continuing communication with the network using the first RAT based on determining that the reattempt counter exceeds the predetermined threshold.

2. The method of claim 1,
wherein the re-selection to the second RAT overwrites network settings installed on the UE for RAT selection.

3. The method of claim 1,
wherein the first and second resource requirements comprise crowd-sourced information received from the network.

4. The method of claim 3,
wherein the crowd-sourced information comprises location-assistance data.

5. The method of claim 3,
wherein the first and second resource requirements further comprise one or more of:
a remaining battery life of the UE;
RAT-specific antenna frequency attenuation; and
a maximum transmit power level of the UE.

6. The method of claim 1, the method further comprising:
based on the determination that the attempt to reselect to the second RAT has failed:
determining that the attempt to reselect to the second RAT failed due to a network failure;
wherein said continuing communication with the network using the first RAT is further based on determining that the attempt to reselect to the second RAT failed due to a network failure.

7. The method of claim 1,
wherein the first and second resource requirements comprise an estimated temperature response of the UE.

8. An apparatus configured for implementation within a user equipment (UE), comprising:
one or more processing elements configured to cause the UE to:
determine a first resource requirement for communication on a network using a first radio access technology (RAT) and a second resource requirement for communication on the network using a second RAT;
trigger a re-selection to the second RAT in response to the UE determining that the second RAT is preferred over the first RAT based, at least in part, on a comparison of the first and second resource requirements; and
wherein, based on a determination that the attempt to reselect to the second RAT has failed, the one or more processing elements are further configured to cause the UE to:
increment a reattempt counter;
determine whether the reattempt counter exceeds a predetermined threshold;
reattempt reselection to the second RAT based on determining that the reattempt counter does not exceed the predetermined threshold; and
continue communication with the network using the first RAT based on determining that the reattempt counter exceeds the predetermined threshold.

9. The apparatus of claim 8,
wherein the first and second resource requirements comprise required transmit power levels; and
wherein the required transmit power levels are calculated based at least in part on an application type associated with communication with the network.

10. The apparatus of claim 9,
wherein the required transmit power levels comprise an estimated energy required per byte of data communicated for each of the first and second RATs.

11. The apparatus of claim 8,
wherein the first and second resource requirements comprise a preference by an operator of the network for the first RAT over the second RAT.

12. The apparatus of claim 8,
wherein the first and second resource requirements comprise an estimated temperature response of the UE.

13. A user equipment (UE), comprising:
at least one antenna;
at least one radio coupled to the at least one antenna for performing wireless cellular communications with a cellular network; and
at least one processing element coupled to the at least one radio, wherein the UE is connected to a network using a first radio access technology (RAT), wherein the UE is configured to:
determine a first resource requirement for communication on the network using the first RAT and a second resource requirement for communication on the network using a second RAT;
trigger a re-selection to the second RAT in response to the UE determining that the second RAT is preferred over the first RAT based, at least in part, on a comparison of the first and second resource requirements; and
based on a determination that the attempt to reselect to the second RAT has failed:
increment a reattempt counter;
determine whether the reattempt counter exceeds a predetermined threshold;
reattempt reselection to the second RAT based on determining that the reattempt counter does not exceed the predetermined threshold; and
continue communication with the network using the first RAT based on determining that the reattempt counter exceeds the predetermined threshold.

14. The UE of claim 13,
wherein the first and second resource requirements comprise required transmit power levels.

15. The UE of claim 14,
wherein the required transmit power levels are calculated based at least in part on an application type associated with communication with the network.

16. The UE of claim 14,
wherein the required transmit power levels are calculated based at least in part on signal strengths associated with the first and second RATs.

17. The UE of claim 14,
wherein the required transmit power levels comprise an estimated energy required per byte of data communicated for each of the first and second RATs.

18. The UE of claim 13,
wherein the first and second resource requirements comprise an estimated temperature response of the UE.

19. The UE of claim 18,
wherein the estimated temperature response is calculated based at least in part on a measurement of the ambient temperature.

20. The UE of claim 18,
wherein the estimated temperature response is calculated based at least in part on a measurement of the temperature of the UE.

* * * * *